(12) United States Patent
Robeck et al.

(10) Patent No.: US 8,047,807 B2
(45) Date of Patent: Nov. 1, 2011

(54) VEHICLE TRANSMISSION WITH JET PUMP

(75) Inventors: Charles M. Robeck, Farmington Hills, MI (US); Robert J. Miller, Livonia, MI (US); Lee J. Becker, Canton, MI (US); Mark R. Dobson, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 602 days.

(21) Appl. No.: 12/250,553

(22) Filed: Oct. 14, 2008

(65) Prior Publication Data

US 2010/0092310 A1    Apr. 15, 2010

(51) Int. Cl.
*F04B 23/08*    (2006.01)
*F04B 23/04*    (2006.01)

(52) U.S. Cl. .............. 417/87; 417/79; 417/89; 417/158; 417/159; 417/279; 60/468; 60/464

(58) Field of Classification Search .......................... None
See application file for complete search history.

(56) References Cited

U.S. PATENT DOCUMENTS

| | | | |
|---|---|---|---|
| 3,620,646 A | 11/1971 | Stevenson et al. | |
| 4,033,706 A | 7/1977 | Schaefer et al. | |
| 4,274,812 A | 6/1981 | Elvidge et al. | |
| 5,351,398 A | 10/1994 | Haxell | |
| 5,799,260 A | 8/1998 | Droste et al. | |
| 5,878,632 A | 3/1999 | Hubler et al. | |
| 5,943,861 A * | 8/1999 | Davison et al. | 60/453 |
| 5,954,481 A * | 9/1999 | Baier et al. | 417/182 |
| 6,171,069 B1 * | 1/2001 | Levitin et al. | 417/187 |
| 6,405,717 B1 | 6/2002 | Beyer et al. | |
| 6,573,339 B1 | 6/2003 | Stieber et al. | |
| 6,666,655 B2 | 12/2003 | Heath et al. | |
| 6,932,029 B2 | 8/2005 | Ranganathan et al. | |
| 6,944,529 B2 | 9/2005 | Person et al. | |
| 7,010,407 B2 | 3/2006 | Karczag et al. | |
| 7,192,257 B2 | 3/2007 | Becker et al. | |
| 7,281,904 B2 * | 10/2007 | Schultz et al. | 417/79 |
| 7,302,798 B2 * | 12/2007 | Smith et al. | 60/464 |
| 2007/0248469 A1 | 10/2007 | Volk et al. | |

* cited by examiner

*Primary Examiner* — Sikha Roy (74) *Attorney, Agent, or Firm* — David B. Kelley; Just Intellectuals, PLLC (57) ABSTRACT

The present disclosure relates to a vehicle transmission with jet pump. The jet pump includes a hydraulic control system that has a nozzle fitted between a first and second housing. The nozzle is separable from the first and second housing. The hydraulic control system is configured to produce a jet stream of fluid through a center section of the nozzle.

16 Claims, 12 Drawing Sheets

VEHICLE TRANSMISSION WITH JET PUMP

TECHNICAL FIELD

The present disclosure relates to a vehicle transmission with jet pump that suppresses cavitation in the transmission pump.

BACKGROUND

Conventional automatic transmissions include a hydraulic control system that governs transmission operating pressure, fluid flow distribution for cooling, lubrication and other purposes as well as the actuation of various transmission components, e.g., clutch assemblies. Fluid is drawn by the pump from the fluid reservoir and delivered to the various transmission components via the control system.

A transmission pump is provided that derives its power from the engine crankshaft. In the case of transmissions with positive displacement pumps, flow rate of transmission fluid at the pump outlet is proportional to engine speed. As engine speed rises, a speed will be reached at which atmospheric pressure will not provide sufficient acceleration to the operating fluid to completely fill the pump rotating elements. This speed is known as the High Speed Fill Limit (HSFL), above which cavitation will occur in the pump, causing reduction in flow rate, unwanted wear on transmission components, pressure fluctuations in the hydraulic system and undesirable noise pollution.

Over some portion of their operating speed range, most positive displacement pumps provide more flow than is required by the transmission. In order to control transmission operating pressure, this excess flow is diverted via a primary pressure regulating valve. Historically, this excess flow was exhausted to the fluid reservoir. An improvement upon this practice is to recirculate the fluid to the pump inlet, thus returning some of the flow energy from the high pressure pump outlet to the pump inlet. More recently, some transmissions have included a jet pump in the recirculation path, maintaining a greater percentage of the flow energy and thereby elevating the pump's inlet pressure. An increased inlet pressure is desirable as it reduces the tendency for cavitation within the pump. This boosting feature is commonly accomplished by forming a nozzle within the recirculation path, integral to the passages formed within the structural components. While this provides the desired boost in the inlet pressure of the pump, the design is inflexible and cannot be altered without changing the structural components. For example, with a nozzle design integrated into a cast housing, altering the jet pump geometry requires expensive changes, such as casting die alteration or replacement. Additionally, the limitations associated with integrating the nozzle into a casting restrict the freedom in specifying the nozzle's geometry.

An alternate approach for incorporating a jet pump in the recirculation path is to position two components such that a nozzle-shaped passage is created between them. However, in such configurations the velocity of the jet stream is contingent upon those components fitting together in the precise manner in which they were designed. Accordingly, the stack up tolerances of the adjacent components must be taken into consideration in designing the jet feature of the pump. Due to these tolerances, the flow area defined by these components may be greater or less than the intended value, thus reducing the effectiveness of the design.

An alternate means of achieving a jet pump is desirable. It is desirable to have a transmission with a jet pump having a nozzle that is separable from the surrounding components. Additionally, it is desirable to achieve a jet pump that directs the jet stream through a center section of the nozzle so as to reduce reliance on the dimensions of other components.

SUMMARY

In one exemplary embodiment, a regulator valve for a transmission, includes: a first housing; a second housing coupled to the first housing, configured to receive fluid from the first housing and supply fluid to a transmission pump; and a nozzle between the first and second housing, separable from the first and second housing. The regulator valve is configured to produce a jet stream of fluid, pulled from a fluid reservoir, through a center section of the nozzle. The regulator valve is configured to produce a primary stream of fluid that converges with the jet stream of fluid.

In another exemplary embodiment, a system for supplying fluid to a transmission pump includes a control body having an second and first housing; and a removable cavitation suppressor between the second and first housing. The control body is configured to produce a jet stream of fluid, pulled from a fluid reservoir, through a center section of the cavitation suppressor, the jet stream of fluid having a greater velocity exiting the cavitation suppressor than entering the cavitation suppressor. The regulator valve is configured to produce a primary stream of fluid that converges with the jet stream of fluid.

In another exemplary embodiment, an automobile transmission that reduces cavitation during operation includes a regulator valve having a first housing and an second housing, the second housing configured to receive fluid from the first housing and supply fluid to a transmission pump inlet; and a nozzle placed between the second and first housing, separable from the first and second housing. The regulator valve is configured to produce a jet stream of fluid through a center section of the nozzle to the transmission pump inlet, the jet stream of fluid having a greater velocity exiting the cavitation suppressor than entering the cavitation suppressor. The transmission further includes a fluid reservoir from which the jet stream of fluid is pulled. The regulator valve is configured to produce a primary stream of fluid flowing from the first housing to the second housing that converges with the jet stream of fluid.

One advantage of the present invention is that it reduces cavitation in the transmission pump and the nozzle provided with the jet pump is separable from the hydraulic control system. In this manner, nozzles of various shapes and sizes can be utilized with different variations of the same basic architecture. Additionally, the performance of the jet pump can be adjusted to a new specification with a relatively simple modification to the nozzle design.

Another advantage of the present invention is that it enables the jet stream of fluid to flow through a center section of the nozzle. Accordingly, the stack up tolerances of the nozzle with respect to adjacent components is immaterial to the velocity of the jet stream. The flow area controlling the jet velocity is contained within the nozzle itself. This design is much more robust against part variability.

Another advantage of the present invention is that the nozzle is positioned centrally with respect to a pump inlet port. In this manner the nozzle is configured to direct a converged stream including the jet stream and primary stream of fluid towards a center of a pump inlet port.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Referring to the drawings, FIGS. 1 through 16, wherein like characters represent the same or corresponding parts throughout the several views there is shown an automobile transmission 10 with a jet pump for reducing pump cavitation. According to Bernoulli's Equation, a high static pressure at one point in the flow can be converted to a high dynamic pressure (and therefore a high velocity) at another point in the flow, and vice-versa. By utilizing a nozzle, the high static pressure, low velocity flow from a main regulator valve can be converted to a high velocity, low static pressure flow downstream of the nozzle. This mixes with the low pressure, low velocity flow from the fluid reservoir to produce a low pressure flow of intermediate velocity. When this flow decelerates into the pump inlet, its dynamic pressure is converted back to static pressure and thereby the pressure in the pump inlet is raised.

Figure 1:
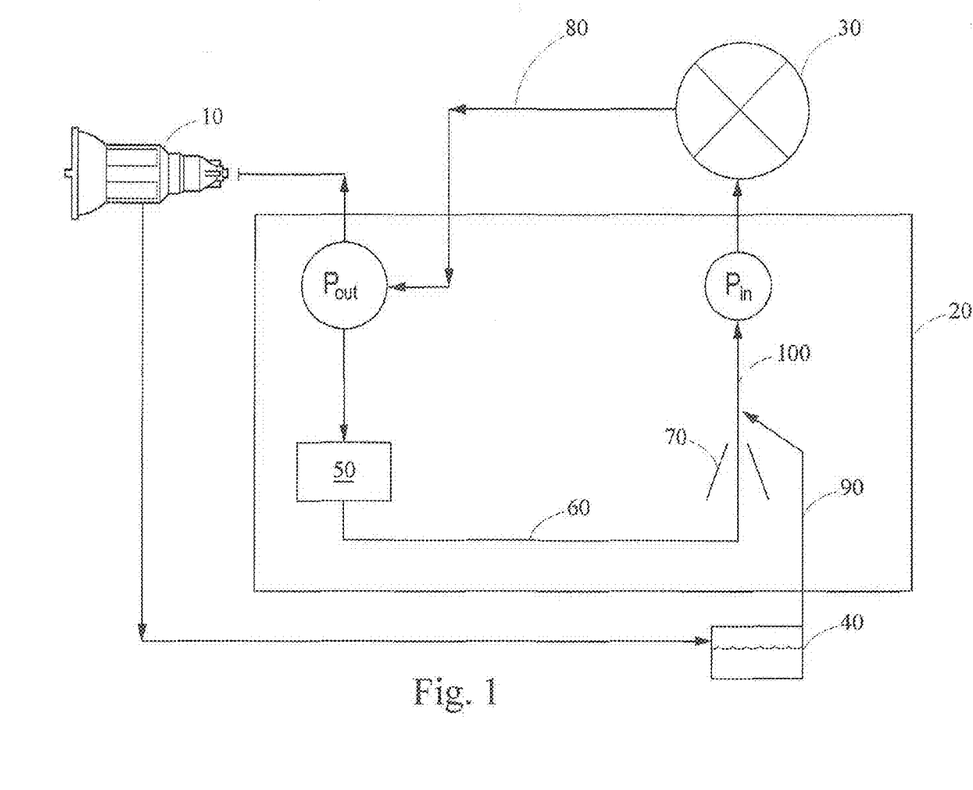
FIG. 1 is a hydraulic schematic of a hydraulic control system for supplying fluid to a transmission pump according to an exemplary embodiment of the present invention.

FIG. 1 is a hydraulic schematic of a hydraulic control system 20 for supplying fluid to a transmission pump 30 according to an exemplary embodiment of the present invention. The pump 30 supplies fluid to a volume at a predetermined pressure, $P_{out}$. The pump 30 provides fluid to the transmission 10; this fluid then returns to a reservoir 40. In order to maintain a predetermined volume at a desired pressure level, $P_{out}$, a regulator valve 50 redirects excess flow provided by the pump via fluid stream 60 to a nozzle 70. The regulator valve flow 60 is volumetrically less than the flow exiting the pump 80, therefore, additional fluid is provided from the reservoir 40 to the pump 30 via fluid stream 90. Fluid streams 60 and 90 converge to form stream 100. The energy carried by fluid stream 60 increases the pressure at the pump inlet, $P_{in}$, so that the pressure is higher than it would be without this flow through the hydraulic control system 20.

Figure 2:
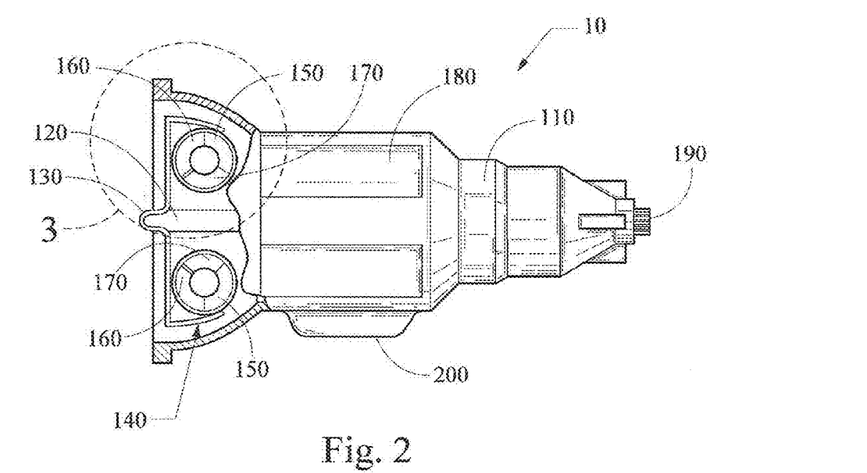
FIG. 2 is a partial cross-sectional view of an automatic transmission according to an exemplary embodiment of the present invention.

The transmission 10, illustrated in FIG. 2, is an automatic transmission. The transmission includes a transmission housing 110 that is partially cut away. The cut-away exposes an input shaft 120 that is indirectly coupled to an engine crankshaft (not shown) through a torque converter cover 130. A torque converter 140 connects converter cover 130 to the input shaft 120 by acting as a fluid coupling. The torque converter 140 includes impeller blades 150 that are driven by the engine crankshaft. A bladed turbine 160 is in fluid communication with a stator 170 and the impeller blades 150. The transmission 10 includes a number of clutch and gear assemblies in section 180 used to alter the speed ratio of the transmission. In the shown transmission 10, various components are hydraulically controlled using a transmission fluid (such as oil) that is circulated throughout the transmission; this fluid also provides cooling and lubrication to the transmission. An output shaft 190 is included at the opposite end of the transmission 10. The transmission also includes a fluid reservoir 200 (or oil pan) at the bottom of the transmission housing 110. Excess fluid is accumulated in the fluid reservoir 200.

While the present teachings relate to an automatic transmission, the present teachings could also be used in a manual or semi-automated transmission, if a positive displacement pump were included in those designs. The teachings may be applied regardless of whether the transmission is a front-, rear- or all-wheel drive transmission.

Figure 3:
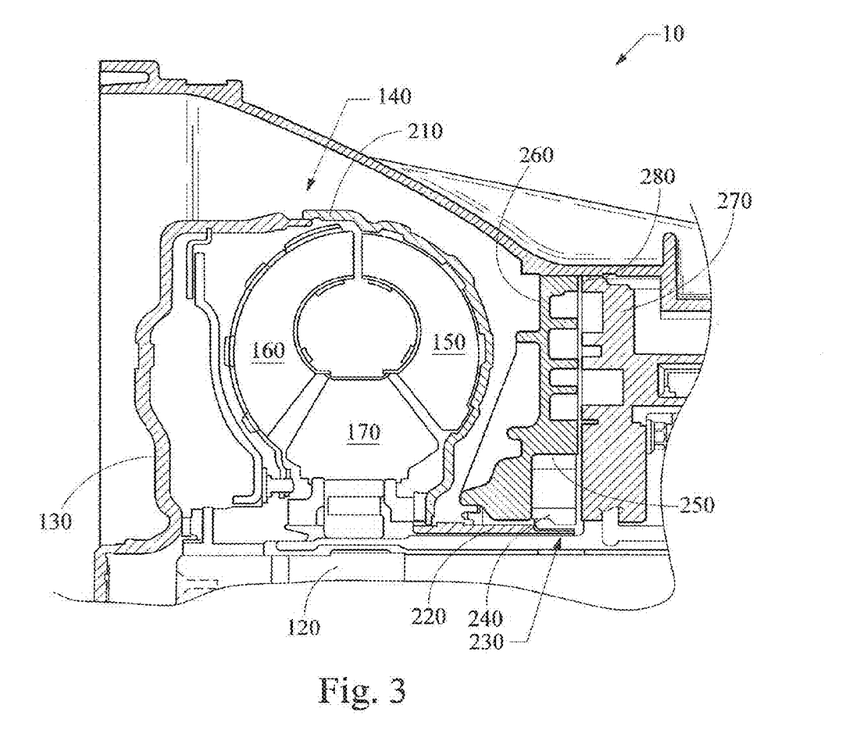
FIG. 3 is a cross-sectional view of the transmission of FIG. 2, showing section 3.

With reference to FIG. 3, a cross-sectional view of the transmission 10 of FIG. 2 along section 3, is shown. FIG. 3 shows an upper quadrant of the transmission 10 in FIG. 2. The torque converter cover 130 is provided to connect a torque converter impeller 210 to the engine crankshaft via a flexplate (or flywheel, not shown). The torque converter cover 130, torque converter impeller 210 and a torque converter hub 220 form an outer casing for the torque converter, housing the torque converter turbine 160 and stator 170 (which can also be referred to as a reactor). Impeller blades 150 are connected to the torque converter impeller 210. In this embodiment, a positive displacement pump 230 is driven by the converter hub 220. The present invention is compatible with alternate embodiments. Other drive configurations are possible in this embodiment however, the pump 230 is driven at some constant ratio of engine speed. The pump 230 may be a gerotor pump, a crescent pump, or other type of positive displacement pump. In the embodiment shown in FIG. 3, the pump 230 includes an internal (or driving) gear 240 that is configured to engage an external (or driven) gear 250. A pump housing 260 is piloted into the transmission housing 110 (as shown in FIG. 2) and houses the pump gears 240, 250. Adjacent the pump 230 is a hydraulic control system 270 (or control body) that hydraulically controls the distribution of fluid throughout the transmission 10. Between the pump 230 and control system 270 is a separator plate 280.

Figure 4:
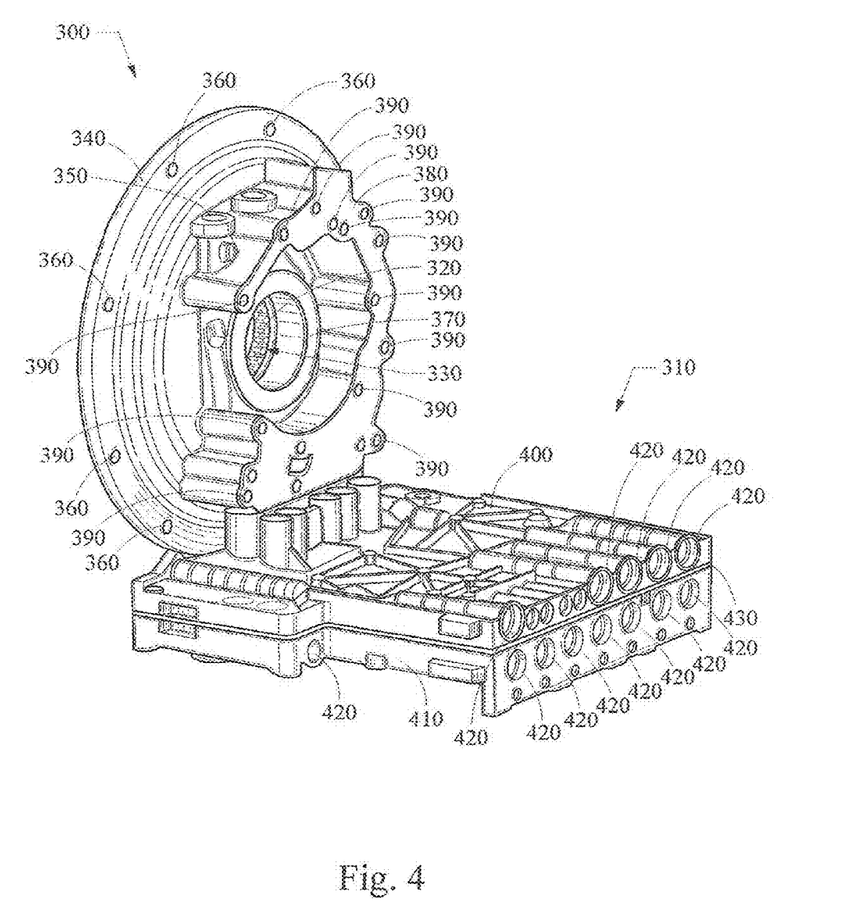
FIG. 4 is a perspective view of a transmission pump and hydraulic control system according to an exemplary embodiment of the present invention.

FIG. 4 illustrates another exemplary embodiment of the present invention. FIG. 4 is a perspective view of a transmission pump 300 and hydraulic control system 310. The pump 300 is configured to be positioned and supported by the transmission housing (e.g., 110 as shown in FIG. 2). The pump 300 includes a set of gears (not shown), one driving gear and a driven gear having internal gear teeth as shown at 320. Fluid is drawn from the control system 310, into a pump inlet port (e.g., 770 as is later discussed with respect to FIG. 14) and into a cavity 330 that houses the gears. The pump 300 includes a pump housing 340 that defines an outlet port 350 which provides fluid to other areas of the transmission. The pump housing 340 can be attached to a transmission housing (e.g., 110 as shown in FIG. 2) by using bolts or other attachment means through apertures 360. Abutting the pump housing 340 is a thrust bearing 370 that is placed adjacent cavity 330. Also shown, is a separator plate 380 that abuts the pump housing 340. The separator plate 380 can be attached to the pump housing 340 using bolts or other attachment means through apertures 390.

The hydraulic control system 310, as shown in FIG. 4, is aligned perpendicularly with respect to the cavity 330 of the pump 300. The control system 310 includes an outlet 760 (as is discussed below with respect to FIG. 14) that guides fluid into the pump inlet port 770. The control system 310 includes an upper housing 400 and a lower housing 410. The upper and lower housings 400, 410 include a number of bores 420 that accommodate various valves (e.g., spool valves). Between the housings 400, 410 is a separator plate 430.

Figure 5:
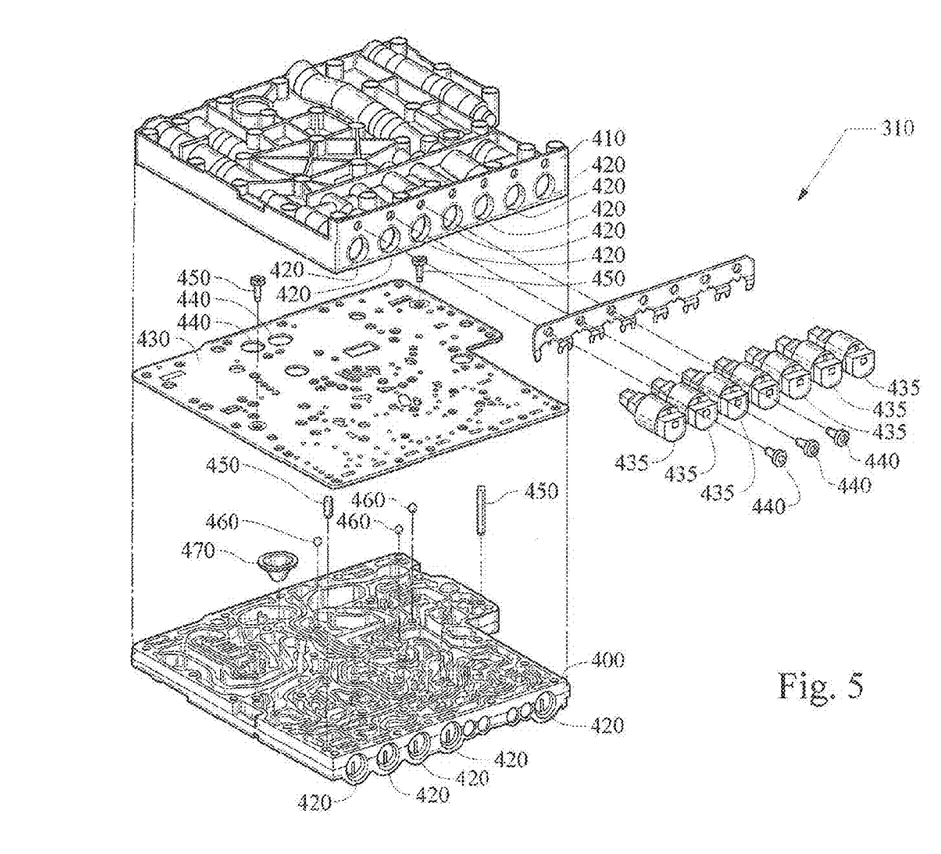
FIG. 5 is an exploded view of the hydraulic control system of FIG. 4.

FIG. 5 is an upside down exploded view of the hydraulic control system 310 of FIG. 4. The upper housing 400 includes a series of bores 420 through which a number of valves can fit. In the illustrated embodiment, solenoids 435 are configured to fit in bores 420. The solenoids can be attached using bolts 440 as shown.

Also shown in FIG. 5 is a separator plate 430 that fits between the upper and lower housing 400, 410. The separator plate includes a number of orifices 440 that enable fluid to flow from between the two housings. In the illustrated embodiment, dowels such as 450 assist in interconnecting the upper and lower housings 400, 410.

The lower housing 410 of the control system 310 is illustrated in FIG. 5. The lower housing 410 also includes a number of dowels 450. Ball valves 460 are included in the system shown in FIG. 5. The control system provides a jet stream of fluid to a transmission pump by using a removable nozzle 470 that is separable from the upper and lower housing 410, 400. The nozzle 470 is held in place by the abutting forces of the housings 400, 410 and separator plate 430. In the illustrated embodiment, nozzle 470 is not attached or affixed to the upper or lower housing 400, 410 and can be removed when the housings are separated from each other.

Figure 6:
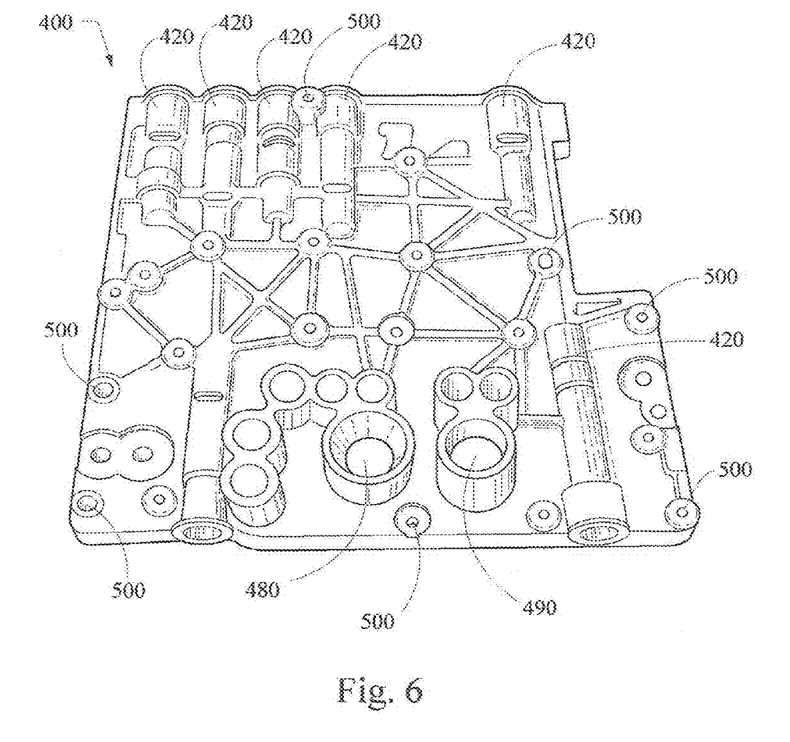
FIG. 6 is a perspective view of the top of the hydraulic control system upper housing of FIG. 5.

FIGS. 6-14 further detail the components of the control system 310 shown in FIG. 5. FIG. 6 is a perspective view of the top of the control system upper housing 400. In practice, the housing 400 may be of varying shapes and sizes. For example, in the embodiment shown in FIG. 3, the control valve 270 is circular in shape. In the illustrated embodiment of FIG. 6, the housing 400 is rectangular in shape.

Housing 400 includes an outlet 480. The outlet 480 is configured to feed into the pump 300 at an inlet port 770 as discussed with respect to FIG. 14. Adjacent the outlet 480 is an inlet 490 into the housing 400. Housing 400 also includes a number of bores 420 configured to house a plurality of valves (such as spool valves and/or pistons). These valves control the distribution of fluid to various transmission components. Housing 400 is configured to be attached to another housing (e.g., 410 as shown and discussed with respect to FIG. 5). Mechanical connection between the housings 400, 410 is provided for by a number of bolt holes 500. Housings are also in fluidic communication with each other via a number of passages, e.g., 440 as shown in FIG. 5.

Figure 7:
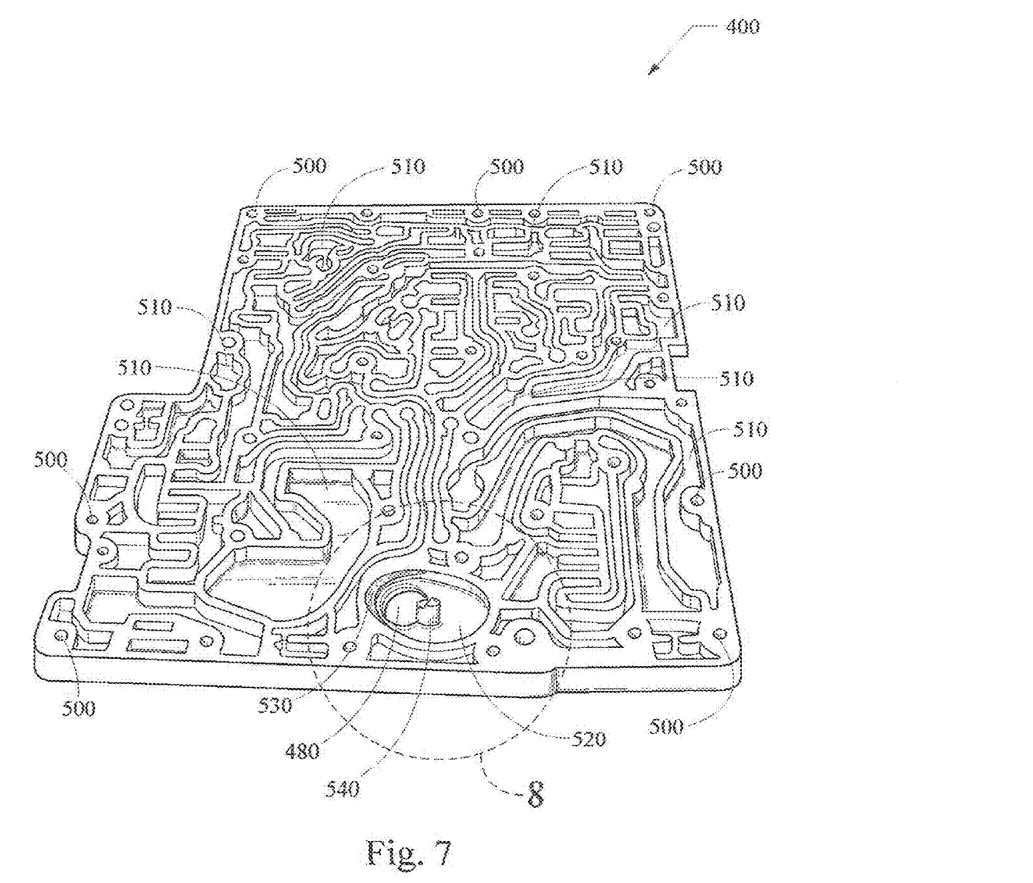
FIG. 7 is a perspective view of the bottom of the hydraulic control system upper housing of FIG. 6.

With further reference to FIG. 7, which shows a perspective view of the bottom side of the upper housing 400, inside housing 400 are a plurality of channels 510. These channels 510 direct fluid to the various components of the control system 310 in order to achieve desired functions. As shown in FIG. 7, and highlighted in FIG. 8, the housing 400 includes a fluid chamber 520. The chamber 520 is configured to hold a nozzle (e.g., 470 as shown in FIG. 5). A groove 530 is formed in the housing 400 to accommodate the nozzle. In this embodiment, a structural member 540 is formed in the housing 400. In another embodiment, the structural member 540 is separable from the housing 400. The structural member 540 provides axial support to the nozzle when inserted in chamber 520. Other embodiments include various structures to accomplish the functionality of structural member 540 (e.g., axially supporting a nozzle) via alternate means. Persons of ordinary skill in the art will appreciate that the presence of the structural member 540 is not a necessary requirement of the present invention. The chamber 520 extends through housing 400 and ends at the outlet 480 of the housing 400, as shown in FIG. 6. In one embodiment, housing 400 is composed of an aluminum alloy and is die cast to specification. Housing 400 can be formed using a number of techniques known within the art, e.g., stamping, milling, etc.

Figure 8:
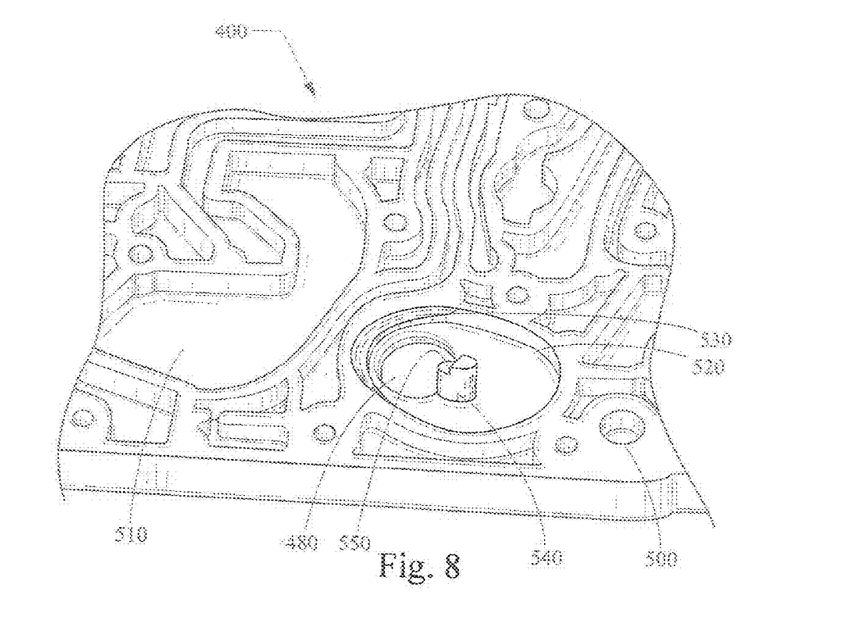
FIG. 8 is a perspective view of the bottom of the hydraulic control system upper housing at section 8 of FIG. 7.
Figure 9:
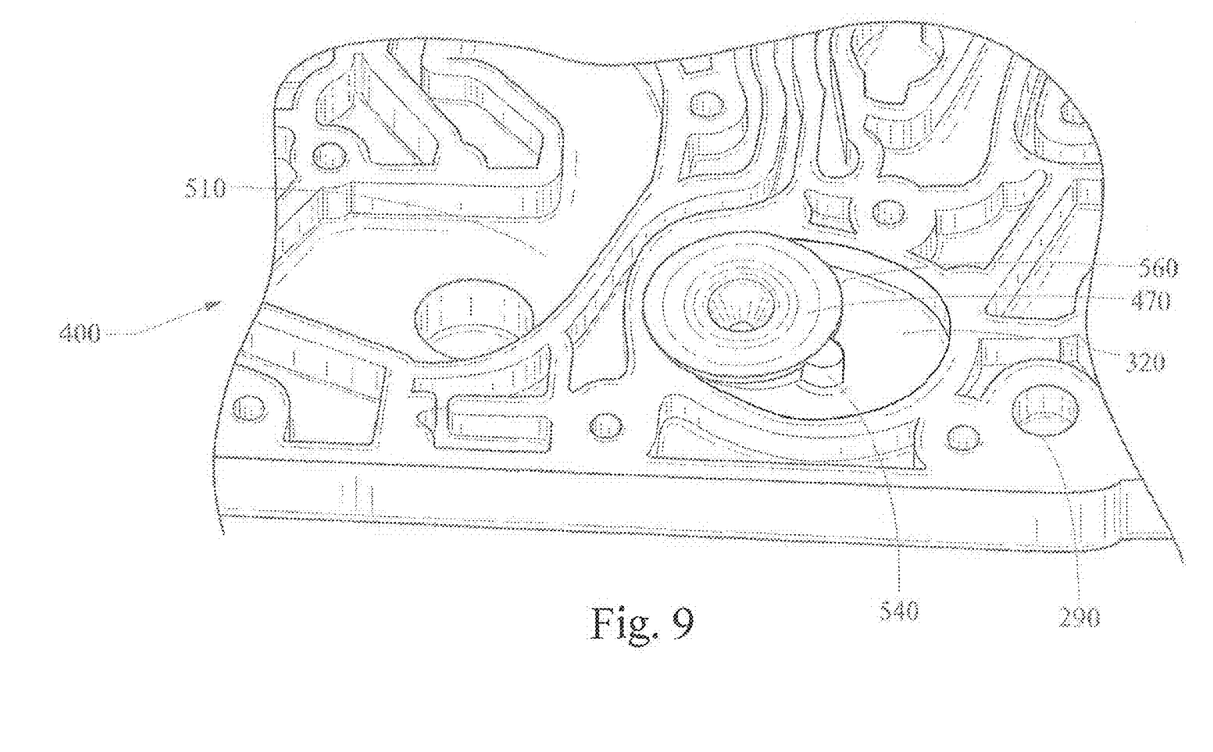
FIG. 9 is a perspective view of the bottom of the hydraulic control system upper housing of FIG. 8 with nozzle.

FIG. 8 shows a perspective view of the bottom of the hydraulic control system upper housing 400 at section 8 of FIG. 7. As shown, the housing 400 does not contain the nozzle 470. Chamber 520 is configured to fit the nozzle 470 (or cavitation suppressor) therein. The outlet 480 is configured to align with an outlet of the nozzle 470. The nozzle 470 includes a rim or flanged edge (560 as discussed with respect to FIG. 9) that can be placed on groove 530 and step 550 formed in structural member 540. FIG. 9 illustrates the upper housing 400 with nozzle 470 placed therein. As shown in FIG. 9, the rim 560 of the nozzle 470 is structurally supported by groove 530 and step 550 shown in FIG. 8.

Figure 10:
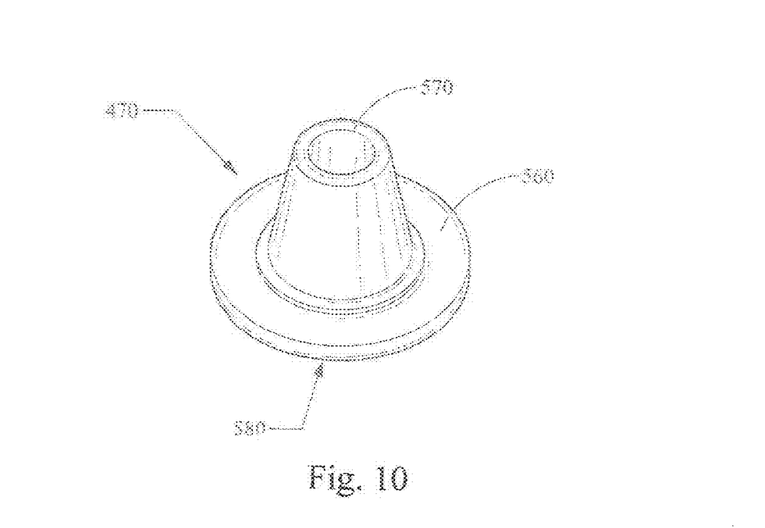
FIG. 10 is a perspective view of the nozzle of FIG. 9.

The nozzle 470, or cavitation suppressor, is shown in FIG. 10. The nozzle 470 can be fitted in the chamber 520 of housing 400. In the illustrated embodiment, the nozzle 470 is conical in shape. The nozzle 470 has an outlet 570 that has an opening that is smaller in diameter than the nozzle inlet 580. In this manner, fluid that passes through the nozzle 470 has a greater velocity exiting than entering the nozzle or cavitation suppressor. The nozzle 470 also includes a rim or flange 560. The rim 560 is configured to abut the outer perimeter of the chamber 520 and fit in housing 400 at groove 530, shown in FIG. 8. Rim 560 also rest against the step 550 of structural member 540. In this embodiment, the retention of the nozzle is achieved via the rim 560; other means for retention could be employed without fundamentally altering the invention. As shown in FIG. 10, the nozzle 470 is separable and can be removed from housing 440. The nozzle 470 can be selectively removed from housings 400, 410 without detachment from any other piece. The nozzle 470 and housings 400, 410 are not formed together or attached.

While in the illustrated embodiment of FIG. 10 the nozzle 470 is shown as being conical in shape, the nozzle can have various configurations. The nozzle functions to reduce the volumetric flow area of fluid flowing therethrough and increase the exiting speed of the fluid. A nozzle within the spirit of the present invention may not be conical in shape but still can be configured to achieve an increase in the velocity of fluid flowing therethrough by decreasing flow area.

The nozzle 470, as shown in FIG. 10, is composed of an aluminum alloy. In other exemplary embodiments the nozzle can be composed of steel, nickel, polymers and other materials. The nozzle 470 can be manufactured using known forming techniques such as stamping or extruding.

Figure 11:
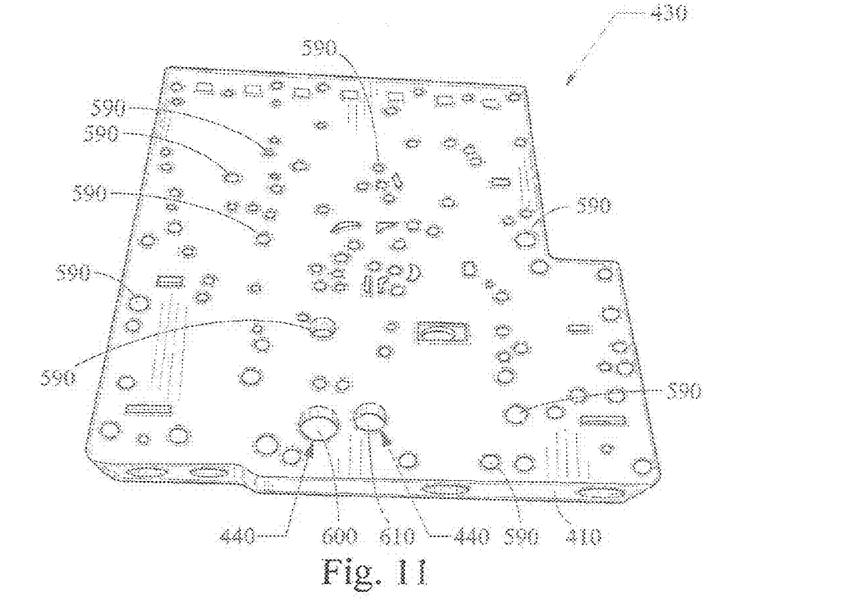
FIG. 11 is a perspective view of the separator plate of FIG. 5 with hydraulic control system lower housing.

In this embodiment, the nozzle 470 is held in place by separator plate 430, as shown on top of housing 410 in FIG. 11. The separator plate 430 fits between housing 400 (shown in FIGS. 6-8) and housing 410 (shown in FIG. 13). The separator plate 430 includes a number of orifices 590 through which fluid can pass. The separator plate 430 shown in FIG. 11 includes two orifices 440. The orifice 600 directs a flow stream from a fluid reservoir into the flow chamber 520 within housing 400. The orifice 610 directs recirculation flow from the second housing 410 into the nozzle 470. In one embodiment, the separator plate 430 is composed of an aluminum alloy.

Figure 12:
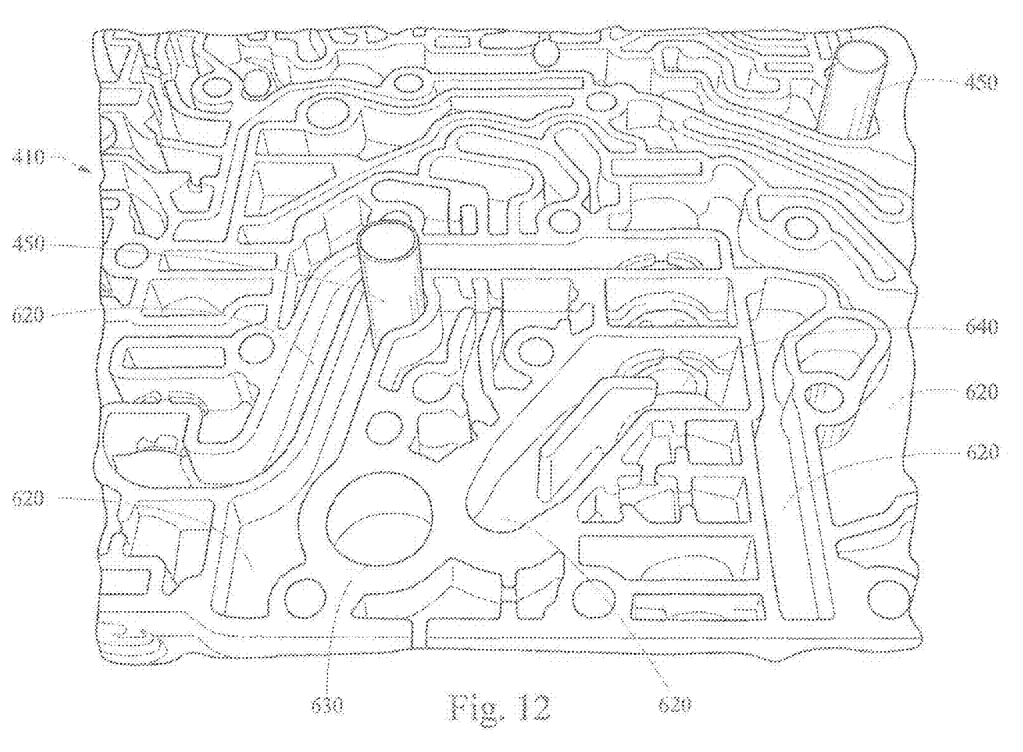
FIG. 12 is a perspective view of the top side of the hydraulic control system lower housing of FIG. 5.

FIG. 12 is a perspective view of the top side of the hydraulic control system lower housing 410 of FIG. 5. The lower housing 410 includes a labyrinth of channels, such as 620, that direct fluid throughout the control system. Shown in FIG. 12 are two dowels 450 that extend between the upper and lower housings 400, 410. The lower housing includes an orifice 630 through which fluid is pulled from a fluid reservoir. A regulator valve 640 is partially shown in FIG. 12. The regulator valve 640 selectively directs fluid through the nozzle 470 as shown in FIG. 10.

Figure 13:
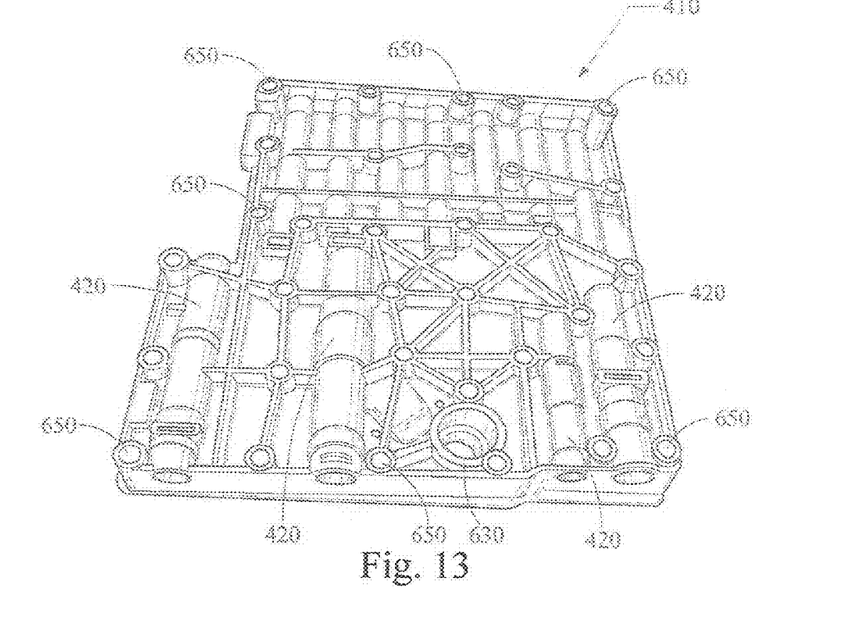
FIG. 13 is a perspective view of the bottom side of hydraulic control system lower housing of FIG. 5.

FIG. 13 illustrates the bottom side of housing 410. Housing 410 includes a number of features 420 (or bores) that accommodate valves (such as spool valves and/or pistons). As described above, housing 410 is mechanically and hydraulically linked to housing 400, nozzle 470, and separator plate 430. Housing 410 also includes hydraulic passages (or channels 620 as shown in FIG. 12) for the recirculation flow that feeds nozzle 470. Bolt holes 650 can be used to attach housing 410 to the upper housing 400 and separator plate 430.

Figure 14:
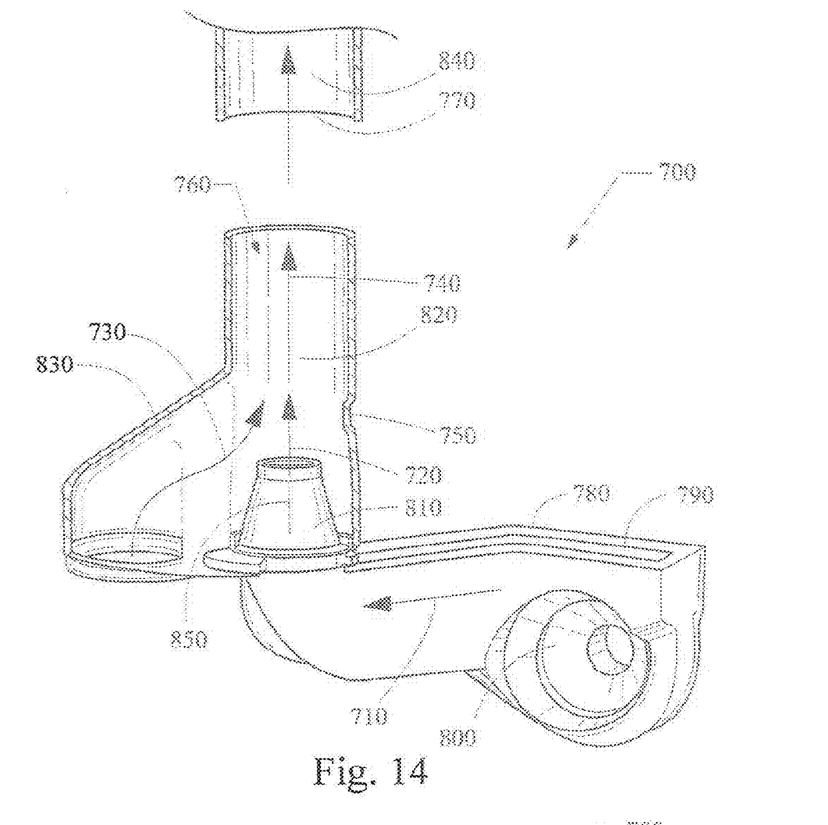
FIG. 14 is a perspective view of a section of a hydraulic control system with fluid streams shown therein according to an exemplary embodiment of the present invention.

FIG. 14 is a perspective view of a portion of a hydraulic control assembly 700 with fluid streams 710, 720, 730 and 740 shown therein according to an exemplary embodiment. This hydraulic control assembly 700 is a part of a system for supplying fluid to a transmission. The illustrated section of the control assembly 700 is a schematic depiction; in practice the hydraulic control system can be rotated to various positions. Shown in FIG. 14 is a housing 750. The housing 750 includes an outlet 760 through which fluid flows into a transmission pump inlet port 770. Housing 780 is also provided. The housing 780 includes a passage 790. The passage 790 is connected to a bore 800 that can be used to hold a regulator or spool valve therein. A nozzle 810 is fitted between housings 750, 780 respectively.

Housing 750 is configured so that two streams of fluid (720 and 730) converge therein and a single converged stream of fluid 740 flows through the outlet 760. Fluid stream 710 flows through passage 790 of housing 780. Fluid stream 710 is the recirculation flow provided by the primary pressure regulator valve; its pressure is higher than that in flow stream 730, which comes from a fluid reservoir (e.g., 200 as shown in FIG. 2). The primary stream of fluid 730 is drawn from the reservoir and flows from housing 780 to housing 750. Fluid stream 710 is accelerated through the nozzle 810 producing a high speed jet of fluid 720. Jet stream 720 travels through a center section 820 of the nozzle 810 as opposed to its outer perimeter. The fluid increases in velocity as it passes through the nozzle 810 due to the converging flow area of the nozzle. As the flow velocity increases, its pressure increases. The fluid stream 730 which is drawn from the fluid reservoir, passes through an arm 830 of housing 750. The two fluid streams 720 and 730 converge to become a converged flow 740 prior to exiting the outlet 760. The nozzle 810 is aligned with the outlet 760 of the housing 750 so that the jet stream 720 is well aligned with the pump inlet port 770.

The relatively high kinetic energy of the jet stream 720 increases the average total pressure of the converged stream or flow 740 so that it is above that of stream 730. As the converged stream 740 enters the pump inlet port 770 it decreases in velocity, resulting in an increase in static pressure at the pump inlet cavity 330 (as shown in FIG. 4). This increased pump inlet pressure greatly reduces, and potentially eliminates, the presence of cavitation in the pump 300 (shown in FIG. 4).

In the illustrated embodiment of FIG. 14, the nozzle 810 is configured to direct the converged stream 740 towards the axial center 840 of the pump inlet port 770. The axial center 850 of the nozzle 810 is substantially in line or collinear with the axial center 840 or center section of the pump inlet port 770. In this manner, the axial center of the nozzle 850 is positioned centrally with respect to the pump inlet port 770.

Figure 15:
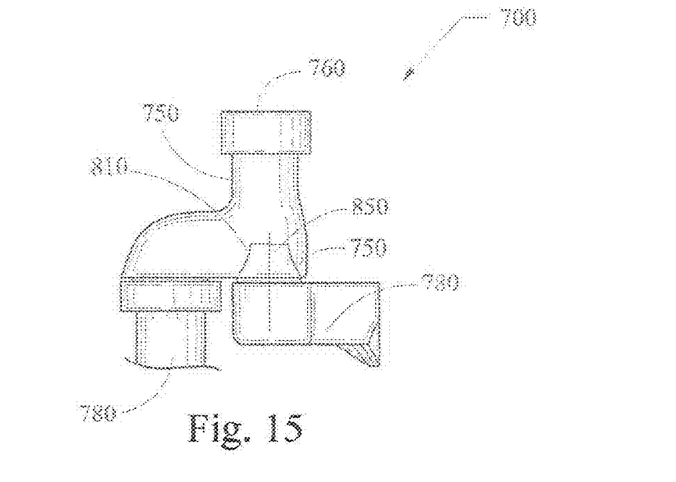
FIG. 15 is a cross-sectional view of the hydraulic control system shown in FIG. 14.
Figure 16:
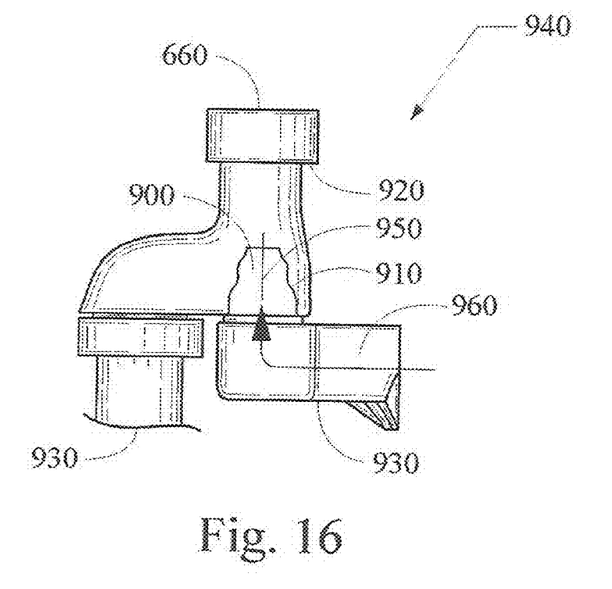
FIG. 16 is a cross-sectional view of a hydraulic control system according to an exemplary embodiment.

FIGS. 15-16 illustrate cross-sectional views of hydraulic control systems 700 and 940 according to various exemplary embodiments. FIG. 15 illustrates a cross section of the embodiment shown in FIG. 14. Housing 750 and housing 780 are shown attached. A nozzle 850, or cavitation suppressor, is fit between housings 750, 780 respectively. The nozzle 850 defines a center section 850 that is axially aligned with the outlet 760 of the housing 750.

FIG. 16 illustrates an exemplary embodiment of a cavitation suppressor 900 for use with the present invention. The cavitation suppressor 900 shown in FIG. 16 has a jagged shell 910 that converges from inlet to outlet. The cavitation suppressor 900 is fitted between housing 920 and housing 930. The cavitation suppressor 900 is configured to increase the exiting velocity of fluid leaving the control system 940 and increase the pressure in the pump cavity (e.g., 330 as shown in FIG. 4). Fluid passes through the cavitations suppressor 900 along the axial center 950 of the cavitation suppressor. The cavitation suppressor 900 includes a recirculation channel 960 therein that routes fluid that has been circulated through the transmission back into a transmission pump. The cavitation suppressor 900 in the illustrated embodiment presents another exemplary embodiment of the present invention. Cavitation suppressors can have various designs and still be within the scope of the present invention.

While the cavitation suppressors 470, 810, and 900 are shown in the illustrated embodiments as nozzle like features various components may be used to reduce cavitation in the transmission pump and still be within the spirit of the present invention.

The invention has been described with reference to certain aspects. These aspects and features illustrated in the drawings can be employed alone or in combination. Modifications and alterations will occur to others upon a reading and understanding of this specification. Although the described aspects discuss aluminum as one material of construction, it is understood that other materials can be used for selected components if so desired. It is understood that mere reversal of components that achieve substantially the same function and result are contemplated, e.g., providing a separable cavitation suppressor that guides a jet stream down its center section can be accomplished via various configurations without departing from the present invention. It is intended to include all such modifications and alterations insofar as they come within the scope of the appended claims or the equivalents thereof. While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims.

What is claimed is:

1. A regulator valve for a transmission, comprising:
    a first housing;
    a second housing coupled to the first housing, configured to receive fluid from the first housing and supply fluid to a transmission pump; and
    a nozzle between the first and second housing, separable from the first and second housing;
    wherein the regulator valve is configured to produce a jet stream of fluid, pulled from a fluid reservoir, through a center section of the nozzle;
    wherein the regulator valve is configured to produce a primary stream of fluid that converges with the jet stream of fluid.

2. The valve of claim 1, wherein the transmission pump comprises a suction nodule and wherein the nozzle is configured to direct the jet stream perpendicularly with respect to the suction nodule.

3. The valve of claim 2, wherein an axial center of the nozzle is positioned perpendicularly with respect to the suction nodule.

4. The valve of claim 1, wherein the nozzle has a conical shape.

5. The valve of claim 1, further comprising a structural member configured to provide axial support to the nozzle.

6. A system for supplying fluid to a transmission pump, comprising:
    a control body having an second and first housing; and
    a removable cavitation suppressor between the second and first housing;
    wherein the control body is configured to produce a jet stream of fluid, pulled from a fluid reservoir, through a center section of the cavitation suppressor, the jet stream of fluid having a greater velocity exiting the cavitation suppressor than entering the cavitation suppressor;
    wherein the control body is configured to produce a primary stream of fluid that converges with the jet stream of fluid.

7. The system of claim 6, wherein the control body is a regulator valve assembly comprising a plurality of channels and valves.

8. The system of claim 6, wherein the cavitation suppressor comprises a nozzle.

9. The system of claim 6, wherein the cavitation suppressor comprises a recirculation channel.

10. The system of claim 9, wherein the jet stream of fluid is pulled from a fluid reservoir.

11. The system of claim 6, wherein the transmission pump comprises a suction nodule and wherein the cavitation suppressor is configured to direct the jet stream perpendicularly with respect to the suction nodule.

12. The system of claim 11, wherein an axial center of the cavitation suppressor is positioned perpendicularly with respect to the suction nodule.

13. The system of claim 6, wherein the cavitation suppressor is configured to increase pressure at a suction nodule of the transmission pump.

14. An automobile transmission that reduces cavitation during operation, comprising:
    a regulator valve having a first housing and an second housing, the second housing configured to receive fluid from the first housing and supply fluid to a transmission pump inlet; and
    a nozzle placed between the second and first housing, separable from the first and second housing;
    wherein the regulator valve is configured to produce a jet stream of fluid through a center section of the nozzle to the transmission pump inlet, the jet stream of fluid having a greater velocity exiting the cavitation suppressor than entering the cavitation suppressor;
    a fluid reservoir from which the jet stream of fluid is pulled;
    wherein the regulator valve is configured to produce a primary stream of fluid flowing from the first housing to the second housing that converges with the jet stream of fluid.

15. The transmission of claim 14, wherein the transmission pump comprises a suction nodule and wherein the nozzle is configured to direct the jet stream perpendicularly with respect to the suction nodule.

16. The transmission of claim 15, wherein an axial center of the nozzle is positioned perpendicularly with respect to the suction nodule.

* * * * *